United States Patent
Brown et al.

(10) Patent No.: US 11,426,648 B2
(45) Date of Patent: Aug. 30, 2022

(54) CONTAMINANT DETECTION/SENSING SYSTEM FOR BOWLING LANE CONDITIONING MACHINE

(71) Applicant: Brunswick Bowling Products LLC, Muskegon, MI (US)

(72) Inventors: Trevis Charles Brown, Muskegon, MI (US); Robert James Prinz, Muskegon, MI (US); Ryan Edward Wiles, N. Muskegon, MI (US)

(73) Assignee: Brunswick Bowling Products LLC, Muskegon, MI (US)

( * ) Notice: Subject to any disclaimer, the term of this patent is extended or adjusted under 35 U.S.C. 154(b) by 722 days.

(21) Appl. No.: 16/180,808

(22) Filed: Nov. 5, 2018

(65) Prior Publication Data
US 2019/0247740 A1 Aug. 15, 2019

Related U.S. Application Data

(60) Provisional application No. 62/630,584, filed on Feb. 14, 2018.

(51) Int. Cl.
*A63D 5/10* (2006.01)
*B08B 3/02* (2006.01)
(Continued)

(52) U.S. Cl.
CPC .............. *A63D 5/10* (2013.01); *A47L 11/03* (2013.01); *B08B 3/024* (2013.01); *B05B 15/658* (2018.02); *G01N 27/06* (2013.01)

(58) Field of Classification Search
CPC ........ A63D 5/10; B08B 3/024; B08B 15/658; B08B 5/658; A47L 11/00; A47L 11/02; A47L 11/03
See application file for complete search history.

(56) References Cited

U.S. PATENT DOCUMENTS 3,042,950 A   7/1962   Ludwig, Jr. et al.
3,083,390 A   4/1963   Wroten
(Continued)

FOREIGN PATENT DOCUMENTS

CN   101481863 B   *   1/2012
DE   3404514 A1       8/1985
(Continued)

OTHER PUBLICATIONS

Machine translation of CN101481863B, dated Jan. 2012. (Year: 2012).*

*Primary Examiner* — Joseph L. Perrin
*Assistant Examiner* — Kevin G Lee
(74) *Attorney, Agent, or Firm* — Womble Bond Dickinson (US) LLP

(57) ABSTRACT

In one aspect, the present disclosure relates to a bowling lane conditioning machine. The bowling lane conditioning machine has a drive mechanism for moving the conditioning machine along a bowling lane, a fluid storage tank that stores a conditioning fluid; a dispensing assembly for dispensing the conditioning fluid about the bowling lane; and a pump for moving the conditioning fluid along a flow path between the at least one fluid storage tank and the dispensing assembly. The conditioning machine further includes contaminant sensing assembly positioned along the flow path of the conditioning fluid for detection of one or more contaminants in the conditioning fluid. Other aspects also are described.

10 Claims, 9 Drawing Sheets

(51) Int. Cl.
  *A47L 11/03* (2006.01)
  *G01N 27/06* (2006.01)
  *B05B 15/658* (2018.01)

(56) References Cited

U.S. PATENT DOCUMENTS

| | | |
|---|---|---|
| 3,150,396 A | 9/1964 | Unterbrink |
| 3,216,037 A | 11/1965 | Stevens et al. |
| 3,319,600 A | 5/1967 | Regan |
| 3,340,559 A | 9/1967 | Klose |
| 3,377,640 A | 4/1968 | Rudolph |
| 3,418,672 A | 12/1968 | Regan |
| 3,604,037 A | 9/1971 | Varner |
| 3,868,738 A | 3/1975 | Horst et al. |
| 3,960,454 A | 6/1976 | Schroeder |
| 4,134,361 A | 1/1979 | Benjamin |
| 4,246,674 A | 1/1981 | Ingermann et al. |
| 4,266,195 A | 5/1981 | Keefner et al. |
| 4,380,844 A | 4/1983 | Waldhauser et al. |
| 4,510,642 A | 4/1985 | Ingermann et al. |
| 4,562,610 A | 1/1986 | Davis et al. |
| 4,738,000 A | 4/1988 | Kubo |
| 4,920,604 A | 5/1990 | Ingermann et al. |
| 4,959,884 A | 10/1990 | Ingermann et al. |
| 4,962,565 A | 10/1990 | Ingermann et al. |
| 4,980,815 A | 12/1990 | Davis |
| 5,063,633 A | 11/1991 | Ingermann et al. |
| 5,161,277 A | 11/1992 | Ingermann et al. |
| 5,243,728 A | 9/1993 | Smith et al. |
| 5,274,871 A | 1/1994 | Smith et al. |
| 5,424,939 A * | 6/1995 | Kweon .................. A47L 13/26 700/1 |
| 5,435,170 A * | 7/1995 | Voelker ................ G01N 27/221 204/409 |
| 5,455,977 A | 10/1995 | Caffrey et al. |
| 5,472,381 A | 12/1995 | Ayre, Jr. |
| 5,517,709 A | 5/1996 | Caffrey et al. |
| 5,613,896 A | 3/1997 | Haus et al. |
| 5,623,743 A | 4/1997 | Burgoon et al. |
| 5,629,049 A | 5/1997 | Caffrey et al. |
| 5,641,538 A | 6/1997 | Caffrey et al. |
| 5,650,012 A | 7/1997 | Davis |
| 5,679,162 A | 10/1997 | Caffrey et al. |
| 5,729,855 A | 3/1998 | Davis |
| 5,753,043 A | 5/1998 | Davis |
| 5,761,762 A | 6/1998 | Kubo |
| 5,935,333 A | 8/1999 | Davis |
| 6,041,472 A | 3/2000 | Kasen et al. |
| 6,090,203 A | 7/2000 | Gebhardt et al. |
| 6,279,196 B2 | 8/2001 | Kasen et al. |
| 6,383,290 B1 | 5/2002 | Davis |
| 6,614,242 B2 | 9/2003 | Matter et al. |
| 6,615,434 B1 | 9/2003 | Davis et al. |
| 6,685,778 B2 | 2/2004 | Davis et al. |
| 6,790,282 B2 | 9/2004 | Davis et al. |
| 6,810,732 B2 | 11/2004 | Shon |
| 6,911,830 B2 | 6/2005 | Heremans et al. |
| 6,923,863 B1 | 8/2005 | Baker et al. |
| 6,939,404 B1 | 9/2005 | Davis et al. |
| 6,989,676 B2 | 1/2006 | Nagy |
| 7,014,714 B2 | 3/2006 | Buckley et al. |
| 7,060,137 B2 | 6/2006 | Davis et al. |
| 7,175,881 B2 | 2/2007 | Baker et al. |
| 7,223,036 B2 | 5/2007 | Chang |
| 7,355,415 B2 | 4/2008 | Boyle et al. |
| 7,453,271 B2 | 11/2008 | Straub |
| 7,521,945 B2 | 4/2009 | Hedges et al. |
| 7,574,899 B2 | 8/2009 | Minott et al. |
| 7,611,583 B2 | 11/2009 | Buckley et al. |
| 7,784,147 B2 | 8/2010 | Burkholder et al. |
| 7,944,220 B2 | 5/2011 | Lock |
| 8,051,528 B2 | 11/2011 | Davis et al. |
| 8,089,290 B2 | 1/2012 | Fuss et al. |
| 8,122,563 B2 | 2/2012 | Burkholder et al. |
| 8,421,486 B2 | 4/2013 | Akiyama et al. |
| 8,643,388 B2 | 2/2014 | Hedges |
| 8,686,745 B2 | 4/2014 | Kirkaune |
| 8,736,274 B2 | 5/2014 | Nonaka et al. |
| 8,890,550 B2 | 11/2014 | Tribut et al. |
| 9,163,813 B2 | 8/2015 | Kusinski et al. |
| 9,295,903 B2 | 3/2016 | Sheirs et al. |
| 9,354,193 B2 | 5/2016 | Platte et al. |
| 2001/0002500 A1 | 6/2001 | Kasen et al. |
| 2003/0140848 A1 | 7/2003 | Davis et al. |
| 2004/0010873 A1 | 1/2004 | Davis et al. |
| 2005/0081782 A1 | 4/2005 | Buckley et al. |
| 2005/0217700 A1 | 10/2005 | Davis et al. |
| 2005/0255248 A1 | 11/2005 | Baker et al. |
| 2006/0032519 A1 | 2/2006 | Field et al. |
| 2006/0107894 A1 | 5/2006 | Buckley et al. |
| 2006/0130754 A1 | 6/2006 | Sias et al. |
| 2006/0192679 A1 | 8/2006 | Buckley et al. |
| 2006/0278161 A1 | 12/2006 | Burkholder et al. |
| 2007/0012247 A1 | 1/2007 | Davis |
| 2007/0289086 A1 * | 12/2007 | Davis .................. A63D 5/10 15/340.3 |
| 2008/0109983 A1 | 5/2008 | Davis |
| 2010/0006028 A1 * | 1/2010 | Buckley .................. A63D 1/00 118/696 |
| 2011/0162156 A1 | 7/2011 | Burkholder et al. |
| 2012/0125378 A1 | 5/2012 | Burkholder et al. |
| 2012/0192368 A1 | 8/2012 | Recknagel et al. |
| 2014/0208529 A1 | 7/2014 | Burkholder et al. |
| 2014/0208530 A1 | 7/2014 | Recknagel et al. |
| 2014/0259479 A1 | 9/2014 | Sheirs et al. |
| 2015/0342440 A1 | 12/2015 | Pedley |
| 2017/0045412 A1 | 2/2017 | Yunker et al. |
| 2017/0049287 A1 | 2/2017 | Knutson et al. |
| 2017/0049288 A1 | 2/2017 | Knutson et al. |
| 2017/0307580 A1 | 10/2017 | Kim et al. |

FOREIGN PATENT DOCUMENTS

| | | | |
|---|---|---|---|
| DE | 4307952 C2 * | 1/1997 | ............... B09C 1/02 |
| EP | 141636 A1 | 5/1985 | |
| EP | 201649 A1 | 11/1986 | |
| GB | 2360619 A | 9/2001 | |
| JP | 61230764 A | 10/1986 | |
| JP | 9024008 A | 1/1997 | |
| JP | 04779013 B2 | 9/2011 | |
| JP | 5904983 B2 * | 4/2016 | ............ A47L 11/302 |
| NL | 1001919 C1 | 6/1997 | |
| RU | 2370324 C2 | 10/2009 | |
| WO | WO2001020323 A1 | 3/2001 | |
| WO | WO2003071913 A3 | 10/2003 | |

* cited by examiner

CONTAMINANT DETECTION/SENSING SYSTEM FOR BOWLING LANE CONDITIONING MACHINE

CROSS REFERENCE TO RELATED APPLICATIONS

This application claims the benefit of U.S. Provisional Patent Application No. 62/630,584, filed Feb. 14, 2018.

INCORPORATION BY REFERENCE

U.S. Provisional Patent Application No. 62/630,584, which was filed Feb. 14, 2018, is hereby incorporated by reference for all purposes as if presented herein in its entirety.

TECHNICAL FIELD

Embodiments of the present disclosure relate generally to bowling lane conditioning machines and, more particularly, to assemblies or systems for detection or sensing of one or more contaminants in bowling lane conditioning machines.

BACKGROUND

A common issue that arises with bowling lane conditioning machines is the accidental or improper introduction of contaminants, e.g., water or other aqueous solution, into the wrong fluid storage tank or tanks of such conditioning machines. For example, bowling lane conditioning machines generally have a fluid storage tank for storage of an oil-based conditioner or dressing fluid and a fluid storage tank for a water-based cleaning fluid; and though numerous efforts/attempts are made to distinguish these two tanks (e.g., labeling, manufacturing the tanks to have different appearances and/or differently sized openings, etc.), water-based cleaning fluids or other aqueous contaminants are often introduced into the fluid storage tank for storing the oil-based conditioner or dressing fluid.

As a result, when such water-based cleaning fluid mix with the oil-based conditioning fluid, not only is efficacy of the conditioning fluid affected, a contaminated mixture, e.g., a sludge, further typically is created, which, over time, can negatively impact the various components of the bowling lane conditioning machine. Furthermore, once a pump is activated for circulation and dispensing of the conditioning fluid, separation of these two phases (e.g., the oil-based conditioning fluid and the water-based cleaning fluid) becomes increasingly difficult, and the effects on the downstream components of the bowling conditioning machine can become quite detrimental to performance/longevity of the bowling lane conditioning machine. For example, the sludge (i.e., the resulting mixture of oil-based conditioning fluid and the water-based cleaner) may coat or otherwise accumulate on/along one or more injectors, fluid lines, pumps, valves, etc. operable for dispensing the conditioning fluid onto a bowling lane, which accumulation may eventually obstruct the flow of fluid from the injectors, e.g., reducing the flow rate from the injectors; and/or impairing functioning of pumps, valves, etc. To remedy this problem, in many cases, all or most of the injectors and other components of the lane conditioning machine typically have to be replaced if contaminated, which replacement can be very expensive and time intensive.

As long as a contamination is detected before the pump is run, however, the problem can be corrected, i.e., by draining and cleaning the fluid storage tank for the conditioning fluid. But, in many cases, operators of the bowling conditioning machine (e.g., end users) may not immediately recognize the effects of such contamination of the conditioning fluid storage tank; and once they realize that the fluid tank(s) has been contaminated, or they may be dis-incentivized from notifying the manufacturer that a water-based contaminant or other aqueous contaminant has been introduced into the fluid storage tank for the conditioning fluid, as that may void the manufacturer's warranty.

Accordingly, it can be seen that a need exists for system or mechanism that detects one or more contaminating solutions in a fluid storage tank or other components of a bowling lane conditioning machine, such as for use in a bowling lane conditioning machine, and is able to prevent operation of one or more components of the machine to prevent circulation of the contaminated solution, and/or to provide a notification to indicate detection of such contamination and log information related thereto. The present disclosure addresses these and other related and unrelated problems in the art.

SUMMARY

Briefly described, the present disclosure is, in one aspect, directed to a sensing system for detecting one or more contaminants, e.g., water or other contaminating aqueous solutions, that have been introduced into a bowling lane conditioning machine. The sensing system may stop, enable, or cause at least a temporary altering of operations of the bowling lane conditioning machine if a contaminant is sensed or detected. Upon detection/sensing of a contaminant, the sensing system further may generate an alarm or other notification to indicate the presence of the contaminant, and also can generate a log or otherwise record information (e.g., time, date, amount, etc.) related to such a contaminant detection.

In one aspect, the sensing system will be used with a bowling lane conditioning machine operable to make one or more cleaning and/or conditioning passes along a bowling lane. The bowling lane conditioning machine typically will have a cleaning fluid delivery and removal system, a conditioning or dressing fluid application system, and a control system, with at least one controller, processor, CPU, or other control circuitry, for control of the operations and functions of the bowling lane conditioning machine.

The cleaning fluid delivery and removal system can include at least one fluid storage tank or reservoir for storage of a cleaning fluid therein, and one or more pumping mechanisms, e.g., a pump, that circulates the cleaning fluid and directs the cleaning fluid to a dispensing mechanism. The dispensing mechanism can include a plurality of nozzles or injectors arranged therealong that distribute or direct the cleaning fluid onto a bowling lane as the lane conditioning machine is moved therealong. The cleaning fluid delivery and removal system further can have one or more fluid distribution and/or removal mechanisms, such as a squeegee, or other suitable members, devices, mechanisms, or combinations thereof, that facilitate distribution, spreading, and/or removal of the cleaning fluid from the bowling lane.

The lane conditioning application system also generally will include a fluid storage tank for storing a conditioning fluid, and a pumping mechanism in communication with the fluid storage tank for circulation of the conditioning fluid and providing the conditioning fluid to the dispensing mechanism for application of conditioning fluid onto a bowling lane as the machine is moved therealong.

According to principles of the present disclosure, the sensing system is operable to capture information indicative of the presence of contaminants or contaminating solutions in the bowling lane conditioning machine and can prevent or alter an operation of the bowling lane conditioning machine, or one or more components thereof, upon detection of one or more contaminants. If water or other aqueous contaminants are detected in the fluid storage tank, the sensing system may generate an alarm or notification and/or may operate to prevent activation of or to deactivate the pump(s) in communication with the fluid storage tank. For example, the sensing system, upon such detection, can interrupt or block a start signal or powering on of the pump, to prevent circulation of contaminated fluids to and from the fluid storage tank to prevent infiltration/exposure to other components of the bowling lane conditioning machine.

Alternatively, the sensing system can send a signal to a controller of the bowling lane conditioning machine indicating the presence of a contaminant, in response to which the controller can take actions such as interrupting or stopping operation of the pump, generating an alarm, logging an event, etc. In addition, or in the further alternative, the sensing system can include an indicator (e.g., a light or other suitable indicator, such as a buzz, bell, etc.) that can be activated to alert a user to the presence of a contaminant.

The sensing system will include one or more sensors or other suitable monitoring devices operable to capture information related to at least one characteristic of the fluid. In one aspect, the one or more sensors may be operable to capture or detect information related to a potential or residence of the fluid, which may indicate the presence of water or other contaminating aqueous solutions/materials. Alternatively, the one or more sensors can capture information related to a pH level of the fluid and provide output data indicative thereof.

In one embodiment, the one or more sensors can include a plurality of conductive portions or members arranged at least partially within the conditioning system and operable to capture information related to the conductivity of the fluid in the conditioning system. The conductive portions can include a first conductive portion and a second conductive portion, spaced apart from each other, and at least partially submerged in the conditioning fluid within the at least one storage tank or other component of the conditioning system, e.g., pump, accumulator, tubing, injector assembly, etc. Detection or reading of a threshold or predetermined voltage or a change in voltage between the conductive portions may be indicative of the presence of water or other contaminating aqueous solution in the oil-based conditioning fluid (e.g., water or other contaminating aqueous solution in an oil-based conditioning fluid).

Detection of a threshold voltage or change in voltage across the conductive portions generally will be indicative of a contaminant (e.g., water or other contaminating aqueous solution) within the conditioning fluid. Conditioning fluids, such as oil-based conditioners, generally are insulating fluids that are substantially non-conductive, and thus, conduction or transfer of voltage across/between the conductors submerged in the conditioning fluid is indicative of the presence of a conducting fluid within the substantially non-conductive conditioning fluid, such as water or another contaminating aqueous solution. The detection of a threshold voltage or a change in voltage may trigger a notification or an alarm to indicate the presence of a contaminant, and also cause the pumping mechanism to be stopped or otherwise prevented from circulating fluids from the fluid storage tank for the conditioning fluid.

In one embodiment, the conducting portions include or can be incorporated or integrated with inlet and outlet tubes for the fluid storage tank for the conditioning fluid. Additionally, or in the alternative, however, the conducting portions can be integrated with other components of the bowling lane conditioning machine. In one example, one or more leads, e.g., wires, etc., connected to or incorporating the conductive portions can be connected to a processor, controller, etc., configured to measure or detect a voltage or changes in voltage across conducting portions, e.g., to facilitate the detection of a voltage or change thereof between the conducting portions.

In one aspect, the sensing system can include inlet and outlet tubes formed from a conductive material that may be incorporated with or replace existing inlet and outlet tubes of the storage tank for the conditioning fluid on existing bowling lane conditioning machines, enabling the use of the sensing system as a modification or retro-fit application according to principles of the present disclosure. If the existing tubes of a lane conditioning machine are not conductive, however, such existing tubes can be replaced with tubes constructed from a conductive material, or including conductive portions such as a metallic or other conductive material, or the conductive portions of the sensing system can be received within and/or attached to the inlet/outlet tubes or other areas of the conditioning system.

The contaminant sensing system further can include a grommet assembly or mount for holding/securing the conductive leads and/or holding/securing inlet and outlet tubes in a substantially spaced apart orientation or configuration, and help substantially prevent movement or dislocation of the tubes in one or more directions, for example, to substantially retard movement of the tubes into contact with each other as the machine is moved about a bowling lane, which might generate a false positive. In one embodiment, the grommet assembly can include one or more substantially rigid bodies with spaced apart openings or notches defined therein and configured for receiving at least the inlet and outlet tubes.

The leads can be coupled to the inlet/outlet tubes of the bowling lane conditioning machine by one or more connection assemblies that can be coupled to each tube and/or coupled to the grommet assembly. These connection assemblies can include one or more clamping portions, e.g., hoop clamps, pipe clamps, etc., engaging the tubes and in communication with the leads. Additionally, or in alternative constructions, the connection assemblies can include other biased portions, e.g., portions/members biased by a spring or other suitable biasing member, to engage the lead portions against at least a portion of the tubes, such as against an exterior surface of the inlet/outlet tubes. Other suitable attachment mechanisms can be used, however, such as soldering, adhesives, etc., without departing from the scope of the present disclosure.

In another aspect, the one or more sensors can include a pH sensor, such as a pH meter or detector, arranged along the chamber/cavity of the fluid storage tank, e.g., along a bottom portion of the fluid storage tank for the oil-based conditioning fluid or other suitable position within the bowling lane conditioning machine. The pH sensor may capture information of the fluid related to a pH level thereof and may generate one or more signals indicative thereof. A specific pH level(s) can indicate the presence of a contaminating fluid, and if so, may generate an alarm and/or deactivate the pump. Upon no reading of a pH value, which can indicate that only oil-based conditioning fluid is present within the fluid storage tank, the pump would be allowed to run normally. Upon the accidental addition of water, or other aqueous solution, however, a threshold pH would be detected by the one or more sensors, and an error message or alarm can be triggered, and/or the pump can be blocked from running to prevent downstream contamination of components. Such a reported error further can be recorded in a machine log, further helping a technical team or manufacturer determine causes for reported machine issues in the future.

The sensing system further may be in communication with the control system of the bowling lane conditioning machine. The control system accordingly can stop or alter one or more operations of the bowling lane conditioning machine based on a detected voltage or pH threshold reported or indicated by a signal from the sensing system. The control system also can include programming workflows, etc. to generate an alarm or other notification and/or log information regarding each such detection of a contaminant.

In still another aspect, a method of operating a bowling machine may be provided. Upon activation of the bowling lane conditioning machine, one or more aspects or characteristics, e.g., a pH, voltage, etc., of the fluid within a fluid storage tank can be monitored or checked, such as the conditioner fluid storage tank, or other suitable fluid storage tank of the bowling lane conditioning system, i.e., as part of a programmed start-up sequence.

Upon detection of a contaminant, e.g., if threshold pH or voltage value is measured/sensed in the tank, the method may include deactivating or preventing activation of one or more pumps of the bowling lane conditioning system. Additionally, upon detection of a contaminant, the method further may include activating an alarm or other suitable notification mechanism, and/or logging or recording notification or other appropriate alert message indicating/reporting the detection of a contaminant, etc., for example, in a machine log. Accordingly, the pump of the bowling lane conditioning system for the fluid storage tank will not be activated if a contaminant is detected in the fluid storage tank so as to prevent the contaminant from spreading to other components of the bowling lane conditioning system.

As a result, the fluid storage tank can be drained, cleaned, and refilled with a new, uncontaminated fluid media, e.g., fluid media having the appropriate purity or proper conditioning mixture, to allow for normal use of the bowling lane conditioning system. If a contaminant is not detected in the fluid storage tank, e.g., threshold voltage or pH value is not measured, the method may include allowing the pump to be activated or to continue to run to begin, or continue, circulation of the fluid, for example, conditioning fluid, from the fluid storage tank to facilitate one or more operations of the bowling lane conditioning machine.

Accordingly, with principles of the present disclosure, the accidental contamination of the oil-based conditioning fluid can be discouraged and/or substantially prevented to help reduce contaminant and/or operator generated machine component failures (e.g., filters, pumps, injectors, etc.), further requiring less refurbishment/replacement of parts by a manufacturer and providing identification and tracking of the introduction of a contaminant into a fluid storage to/by an end user, rather than the manufacturer.

Those skilled in the art will appreciate the above stated advantages and other advantages and benefits of various additional embodiments by reading the following detailed description of the embodiments with reference to the below listed drawing figures.

BRIEF DESCRIPTION OF THE FIGURES

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

Figure 1:
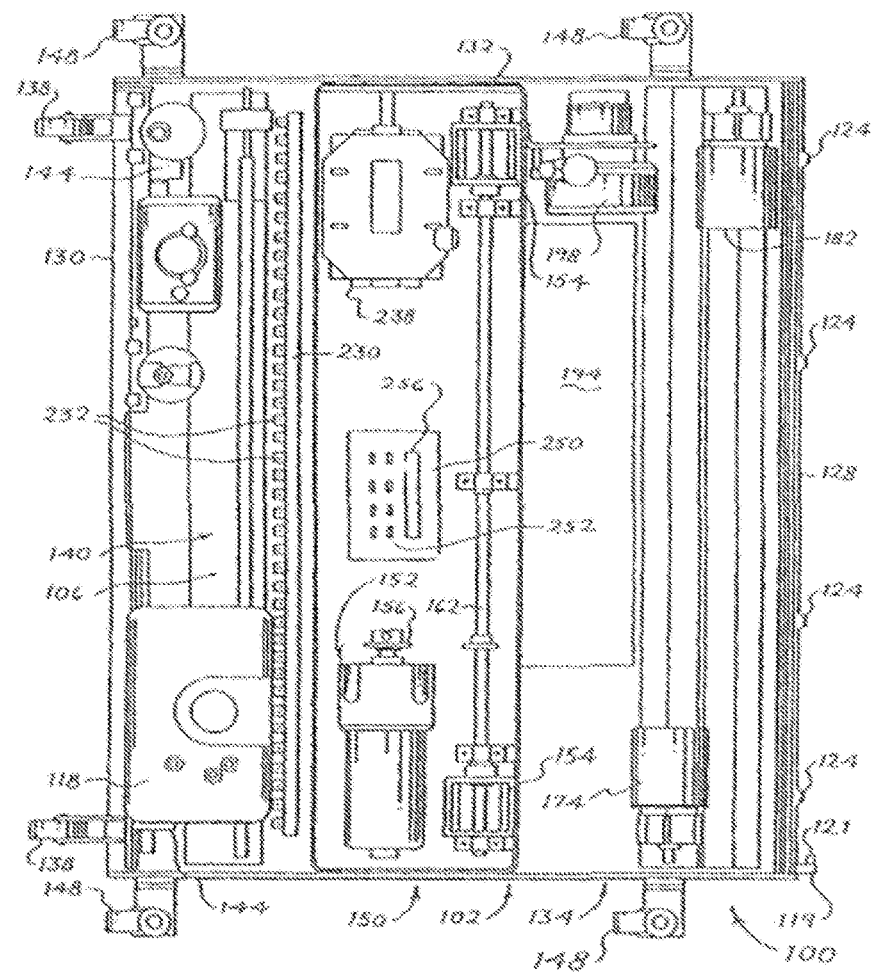
FIG. 1 is a top plan cutout view of a bowling lane conditioning machine according to one aspect of the present disclosure.

Various objects, features and advantages of the present disclosure will become apparent to those skilled in the art upon a review of the following detail description, when taken in conjunction with the accompanying drawings.

DETAILED DESCRIPTION

Referring now to the drawings wherein like reference numerals designate corresponding parts throughout the several views, FIGS. 1-11 illustrate components of a bowling lane conditioning machine 100 according to principles of the present disclosure. The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the present disclosure and not in limitation thereof.

FIGS. 1-8 show a bowling lane conditioning machine 100 operable to make one or more cleaning and/or conditioning passes along a bowling lane. The bowling lane conditioning machine 100 includes housing 102 that at least partially supports/houses a cleaning fluid delivery and removal system 120, a conditioning or dressing fluid delivery and application system 140, drive system 150, and control system 250. The bowling lane conditioning machine 100 can include any suitable lane conditioning machine, such as those described in U.S. Pat. Nos. 8,122,563, 7,784,147, 7,611,583, and U.S. Patent Application No. 2012/0192368, which are incorporated by reference herein as if set forth in their entireties.

Figure 2:
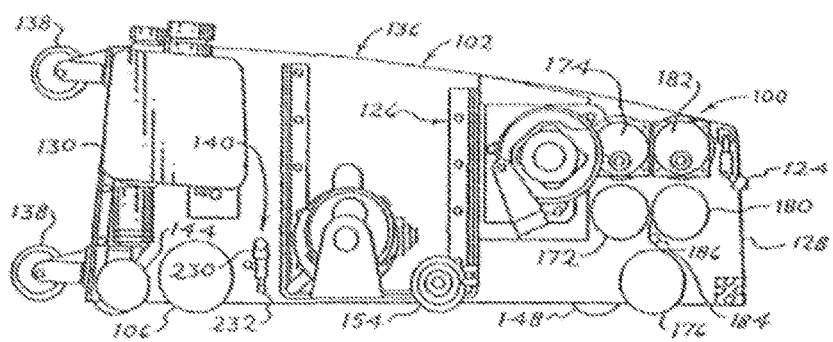
FIG. 2 is a side elevation cutout view of the bowling lane conditioning machine of FIG. 1.
Figure 3:
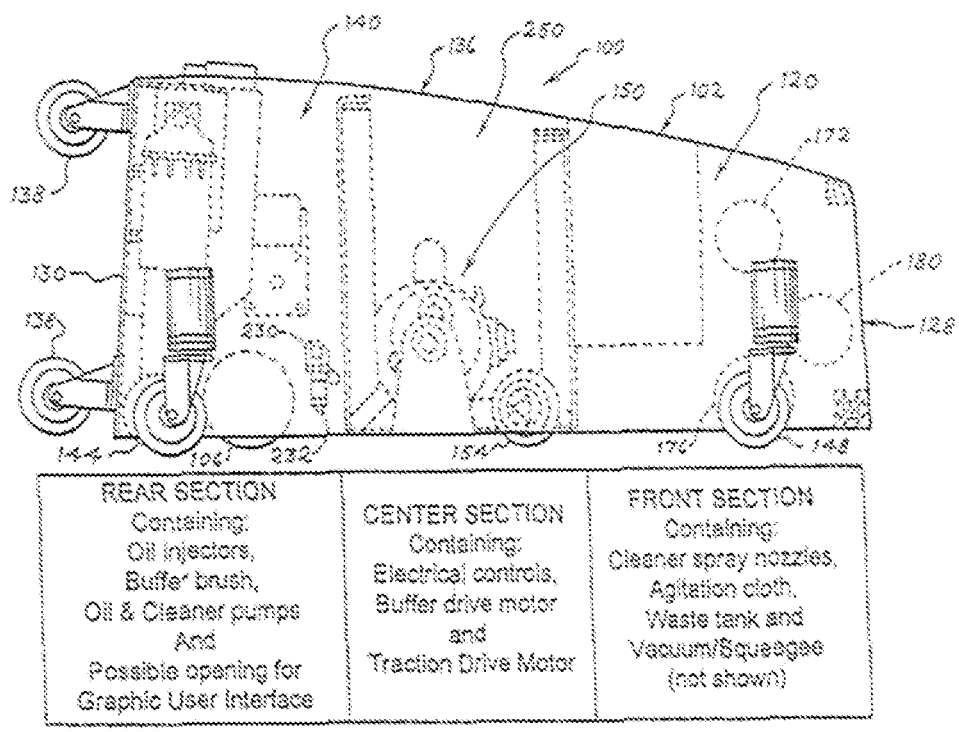
FIG. 3 is a another side elevation cutout view of the lane conditioning system of FIG. 1 illustrating the layout of various internal components.
Figure 4:
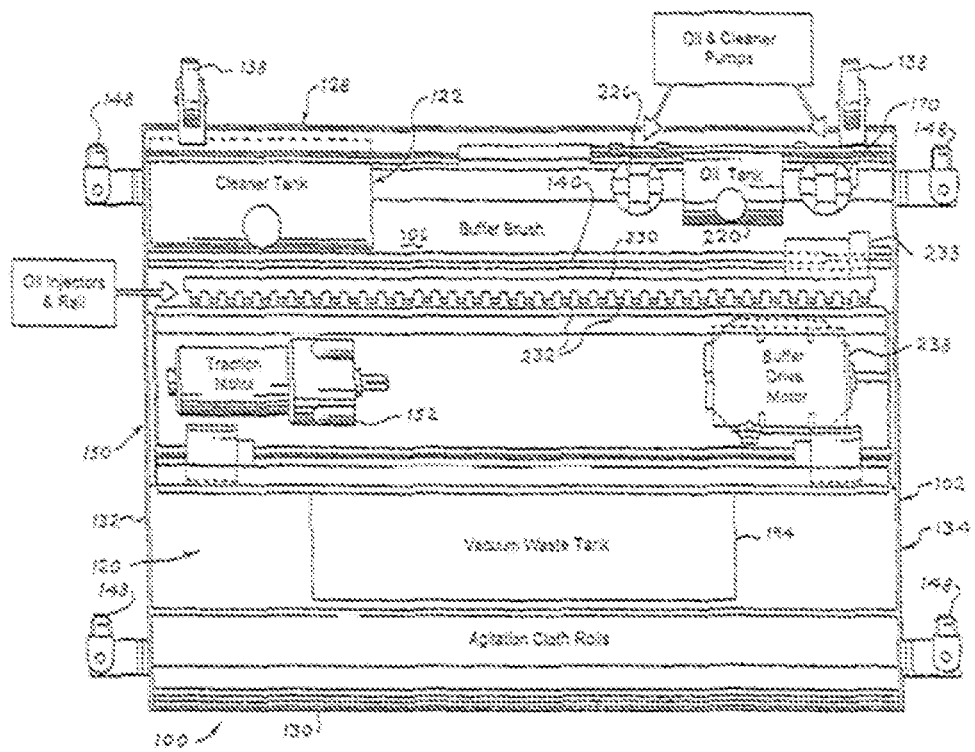
FIG. 4 is a top plan view of the bowling lane conditioning system of FIG. 1 shown with the covers and various components removed.
Figure 5:
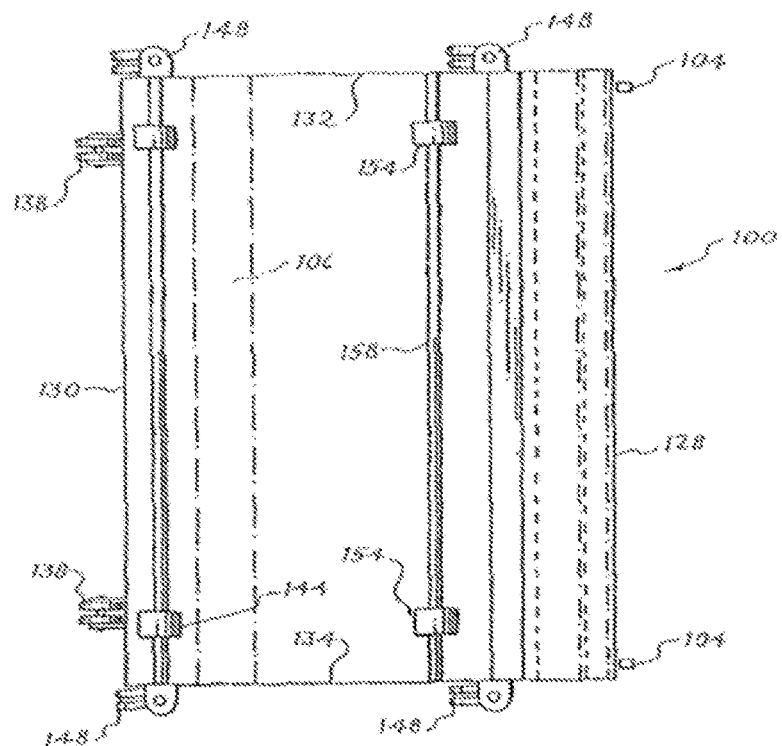
FIG. 5 is a top plan view of a portion of the bowling lane conditioning system of FIG. 1 with covers and various components removed for clarity.
Figure 6:
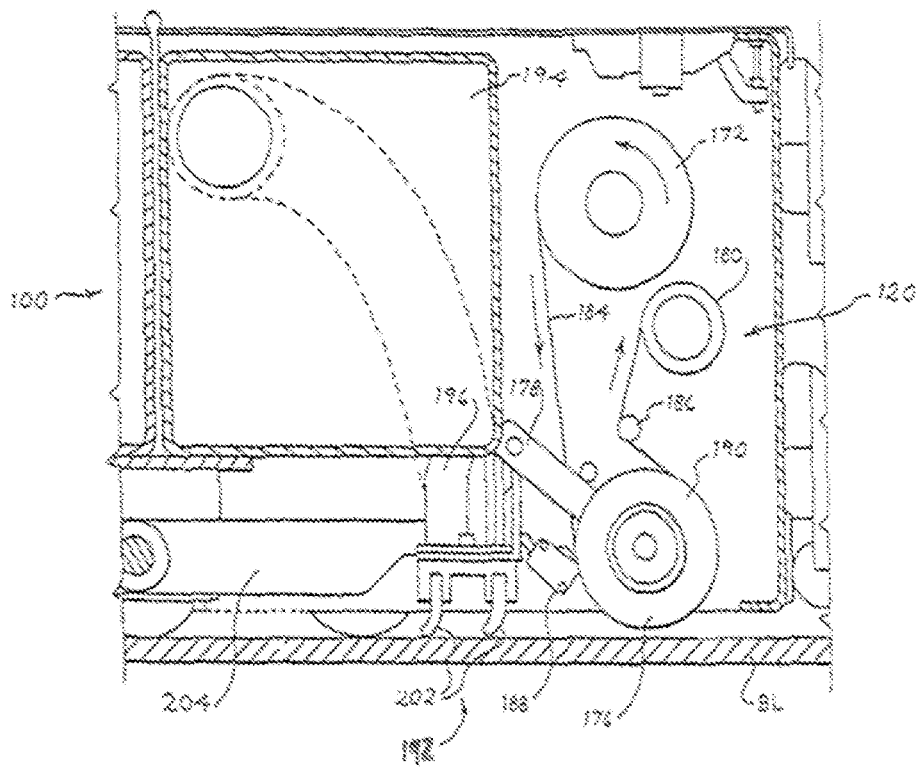
FIG. 6 is a partial, side elevational view of the bowling lane conditioning system of FIG. 1.

As shown in FIGS. 1-4 the cleaning system 120 will include at least one cleaning fluid reservoir or storage tank 122 and a cleaning fluid distribution mechanism, such as one or more delivery nozzles 124, for example, for application of a water-based or other aqueous cleaning fluid onto a bowling lane BL. The cleaning system 120 further generally can include a duster cloth supply roll 172 and at least one driven mechanism 174 operatively connected to the roll 172 for feeding or discharging a duster cloth 184 during a conditioning pass of lane conditioning system 100, as generally shown in FIG. 6. A duster roller 176 further may be pivotally mounted below duster cloth supply roll 172 by pivot arms 178 for moving the duster cloth into contact with the bowling lane BL when the duster roller is pivoted downward during the conditioning pass and otherwise being pivoted out of contact from the bowling lane or other surfaces (FIGS. 2-3 and 6).

The duster cloth 184 generally will be placed on duster cloth supply roll 172 and looped around duster roller 176 to provide engagement and mechanical scrubbing action of the cleaning fluid against the bowling lane prior to extraction by vacuum system 126. A waste roller 180 further may be provided above duster roller 176 and operable by a waste roller windup motor 182 to lift duster roller 176 away from a bowling lane surface and simultaneously roll used duster cloth for facilitating subsequent removal and discarding thereof. As shown in FIG. 6, the duster cloth 184 may extend from the cloth supply roll 172 around duster roller 176 and guide shaft 186 to be wound around waste roller 180. In operation, by activating duster cloth unwind motor 174, duster cloth supply roll 172 rotates to produce a slack in duster cloth 184 to allow duster roller 176 to pivot under its own weight into contact with bowling lane BL. The downward travel of duster roller 176 may be detected by a duster down switch 188 or by other suitable means.

After completion of the one or more cleaning or conditioning passes, the waste roller windup motor 182 may be operated to rotate waste roller 180 for removing any slack in duster cloth 184 and for pivoting duster roller 176 upwards out of contact from bowling lane BL. The upward travel of duster roller 176 may be detected in a similar manner as the downward travel by a duster up switch 190 or by other suitable means without departing from the present disclosure.

FIG. 6 further shows that the cleaning system 120 may further include a cleaner removal system 192, a removable waste reservoir 194 for storing fluid suctioned by vacuum system 126, and a vacuum hose 196 that fluidly connects the squeegee system 192 to the waste reservoir 194, and a vacuum hose 196 that fluidly connects the waste reservoir 194 to a vacuum pump. For example, as shown in FIG. 6, the cleaner removal system can include a pair of transversely disposed resilient squeegees 202 pivotally mounted by pivot arms 204 and operated by first and second linkages, which move squeegees 202 into contact with a bowling lane surface by means of a squeegee up/down motor (not shown), with the squeegees 202 sized, dimensioned, or otherwise configured to generally extend across the width of a conventional bowling lane. The first linkage may be operatively coupled with pivot arms 204 and the second linkage may operatively couple the squeegee up/down motor to the first linkage. One of the second linkage also may be operatively coupled with the squeegee up/down motor in an offset cam arrangement such that rotation of the motor lifts the first linkage so as to pivot squeegees 202 into contact with a bowling lane surface and operate squeegee down switch (not shown), and such that continued rotation of the motor in the same direction moves the first linkage downwardly to retract squeegees 202 from the lane surface and operate the squeegee up switch. The cleaning system 120 further may optionally include a dryer having an opening behind squeegees 202 to substantially dry any remaining moisture not removed by vacuum system 126 before application of a lane conditioning or dressing fluid.

As further shown in FIGS. 1-4, the drive system 150 may include a drive motor 152 operatively connected to drive wheels 154 for facilitating an automatic travel of the lane conditioning system 100 during a conditioning/cleaning pass (e.g., a pass from foul line to pin deck) and return pass (e.g., a pass from pin deck back to foul line) thereof. The drive motor 152 may be operable at a plurality of speeds in forward and reverse directions for thereby propelling lane conditioning system 100 at variable speeds along the length of bowling lane BL, and may include a drive sprocket 156 or other suitable transmission mechanism mounted on motor shaft 158. An end-of-lane sensor 119, which can include a contact wheel 121 or similar detector, that may be affixed adjacent front wall 128 of lane conditioning machine 100 for preventing further travel of machine 100 when wheel 121 rolls off the edge of the pin deck of bowling lane BL. Sensor 119 further may be operatively connected to the control system 250 of the bowling lane conditioning machine to provide information/feedback to the control system 250, enabling the control system to monitor, determine and learn the distance to the end of a lane based upon the number of turns of wheel 121 and/or the number of turns of another wheel of lane conditioning system 100.

Figure 7:
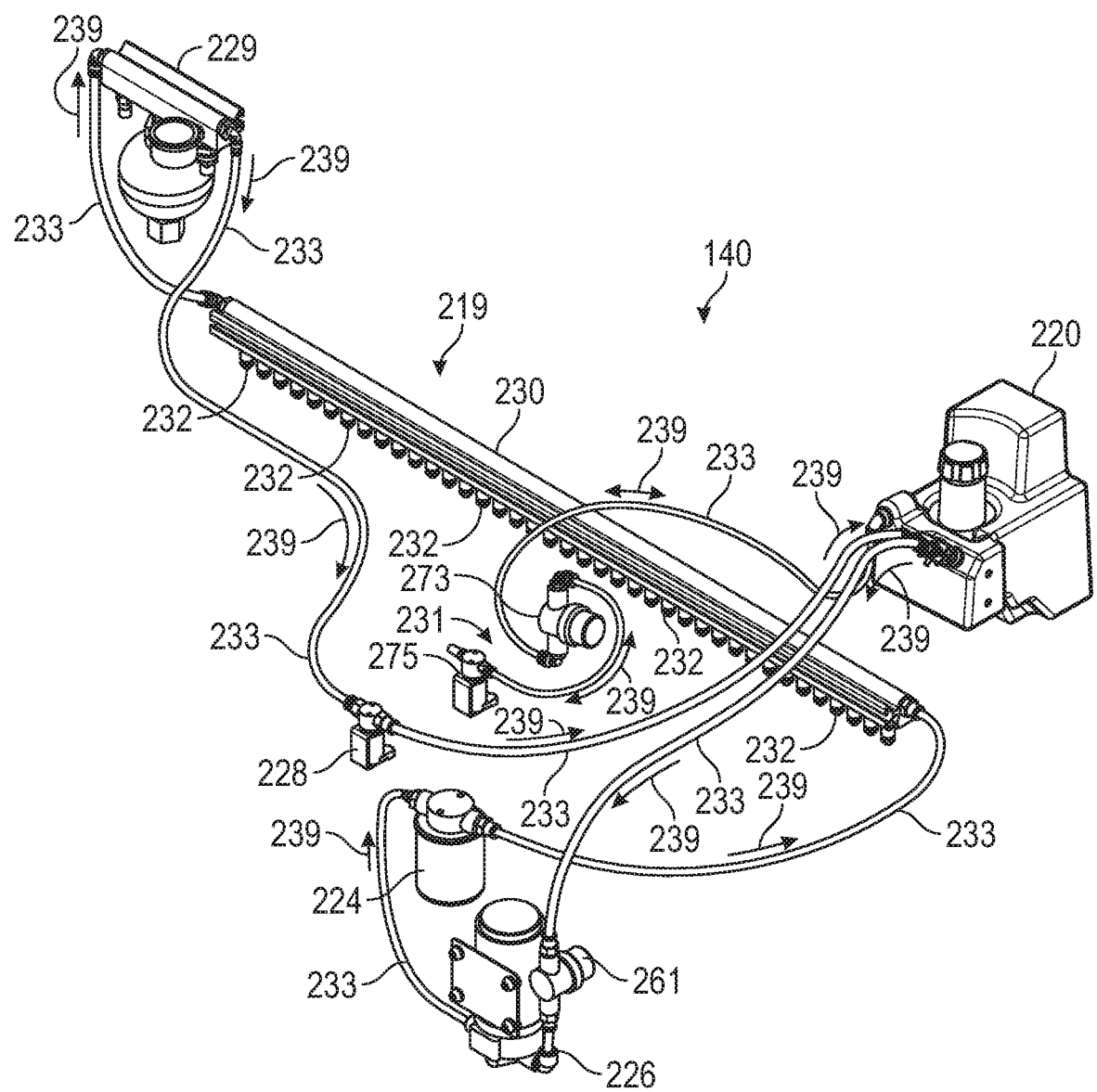
FIG. 7 is a fluid flow diagram of a conditioning or dressing fluid application system according to one aspect of the present disclosure.

In addition, as shown in FIGS. 1-4 and 7, the housing 102 of the bowling lane conditioning machine 100 may include the conditioner application system 140 disposed therein. The conditioner application system 140 may include a dispensing mechanism 219, a conditioning or dressing fluid storage tank 220, a fluid filter 224, a fluid pump 226, a fluid pressure sensor/regulator 228, and a fluid pressure accumulator 229 and vent 231 in fluid communication via a series of flexible conduits, such as tubing or hoses 233, or other suitable conduits (FIG. 7). The dispensing mechanism 219 also can include an injector rail 230 with precision delivery injectors 232 operatively mounted therealong for depositing the conditioning fluid. The injectors 232 can also be configured to spray or apply the conditioning fluid in various patterns and/or volumes along/across the bowling lane.

Additionally, the conditioner application system also include buffer 106 having a driven sheave operatively connected to a buffer drive motor 238 such as by a belt. The buffer drive motor 238 can drive the buffer 106 at a generally steady or at variable speeds and in clockwise or counterclockwise directions depending on the travel speed and direction of lane conditioning system 100 during its conditioning and/or return passes thereof. The buffer 106 also can be moveable into contact with bowling lane BL during the conditioning pass, such as by engaging a buffer up/down motor, and out of contact from bowling lane BL or other surfaces when not in use. Buffer up and down switches or other means may be provided for controlling and/or signaling the maximum up and down travel positions of buffer 106. The buffer up and down switches may be similar in operation to the squeegee up and down switches.

FIG. 7 illustrates a fluid flow diagram of the conditioning application system 140. The flow path 239 includes the tubing/hosing 239 connecting the conditioning or dressing fluid tank 220, a pre-filter 261, the fluid pump 226, the fluid filter 224 (e.g., including up to a 10 micron automotive type spin-on oil filter), the injector rail 230 (e.g., containing a conditioning fluid heater (not shown) and precision delivery injectors 232), the accumulator 229, the fluid pressure sensor/regulator 228, a conditioning vent overflow assembly 273, and a conditioning vent valve 275. The conditioning fluid pump 226 can circulate the conditioning or dressing fluid in a loop from the tank 220, through the filters 261/224, connecting tubing 233, injector rail 230, accumulator rail 229 and back into the tank 220 while the heater is on to bring the system to a stabilized, controlled temperature. A conditioning fluid flow valve and a conditioning vent valve (not shown) open to allow fluid circulation with a desired or minimized pressure in the connecting tubing and to avoid excess pressure or a vacuum in the conditioning fluid tank 220. When the conditioning or dressing fluid 233 reaches operating temperature (e.g., set to about 80° F. (about 21° C.) though temperatures greater than or less than 80° F., such as 70° F., 75° F., 85 F, etc. can be selected without departing from the scope of the present disclosure), the conditioner pump 226 turns off. The system also allows operation without heating the oil.

The conditioning system may precharge the pressure in the injector rail 230 before the machine applies the oil pattern onto each lane. It accomplishes this by turning on the conditioning fluid pump 226, closing the conditioning fluid flow valve (which starts accumulating pressure in the injector and accumulator) and monitoring the conditioning fluid pressure sensor/regulator 228 to turn off the pump 226 when the pressure reaches a predetermined pressure, e.g., about 30 psi though other pressures, e.g., about 20 psi, about 25 psi, about 30 psi, etc., can be selected without departing from the scope of the present disclosure. The conditioning vent valve is open during this operation so no pressure or vacuum builds up in the conditioning fluid tank 220. The conditioning fluid flow valve then opens to allow conditioning to bleed off pressure and allow conditioning to return to the conditioning fluid tank 220 until the conditioning fluid flow valve closes to hold a normal operating pressure, e.g., about 20 psi or other suitable pressure. At that point, the system is ready for the machine to apply conditioning as it travels down the lane.

In one preferred embodiment, the conditioning fluid pressure accumulator 229 will supply conditioning or dressing fluid and maintain a minimal pressure drop as the injectors 232 meter conditioning in the specified amount, e.g., about every 1 to 2 inches, such as about 1.2 inches or other suitable numbers therebetween, along the length of the lane. As discussed in detail below, the pump 226 further will be at least temporarily deactivated upon detection of one or more contaminants (e.g., water or other contaminating aqueous solution) in the conditioning/dressing fluid.

Figure 9A:
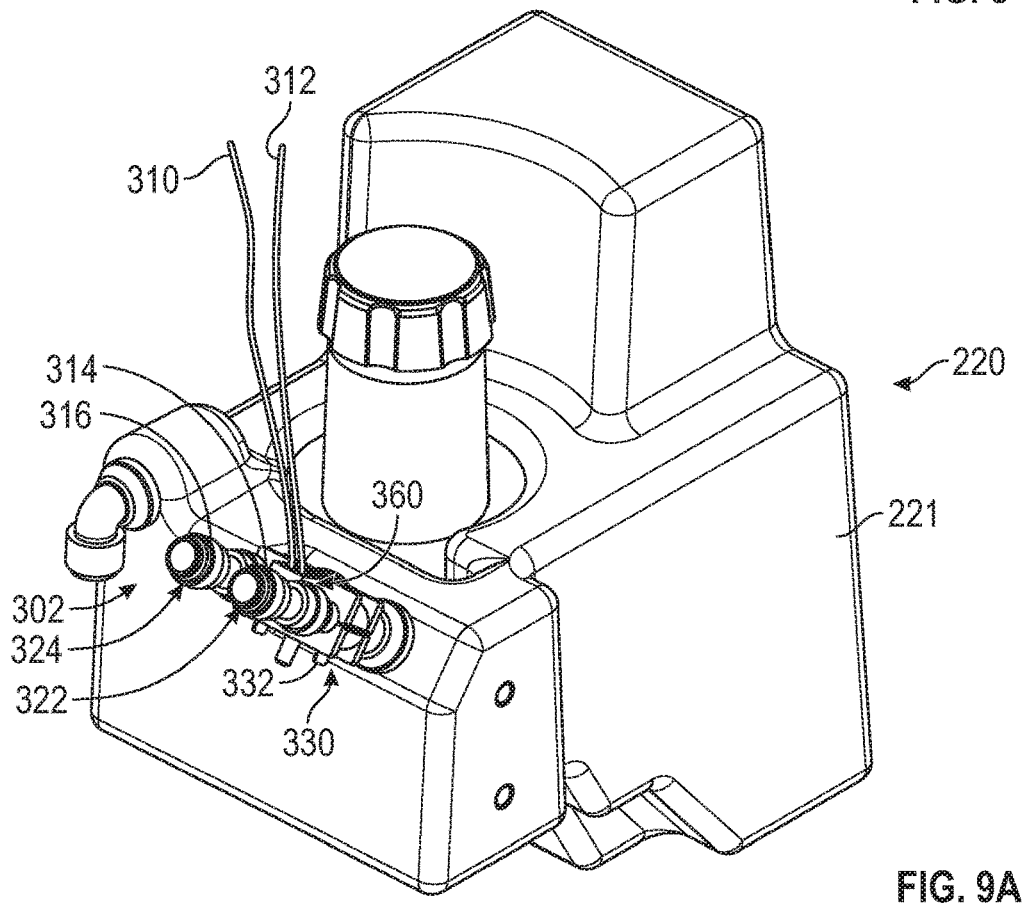
FIGS. 9A, 9B, and 9C illustrate prospective, exploded, and phantom views of a fluid storage tank with a contaminant sensing system according to one aspect of the present disclosure.
Figure 9B:
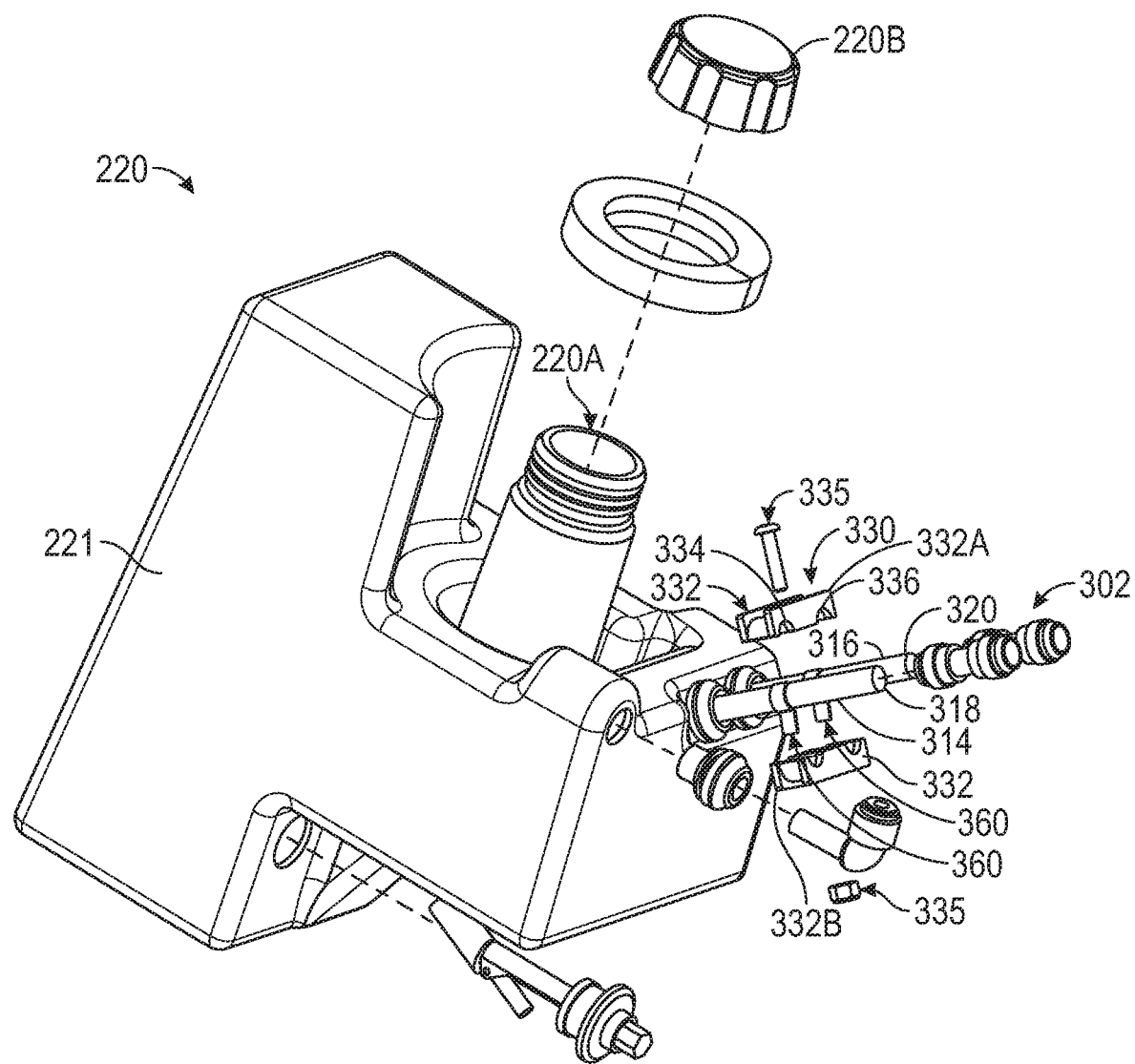
Figure 9C:
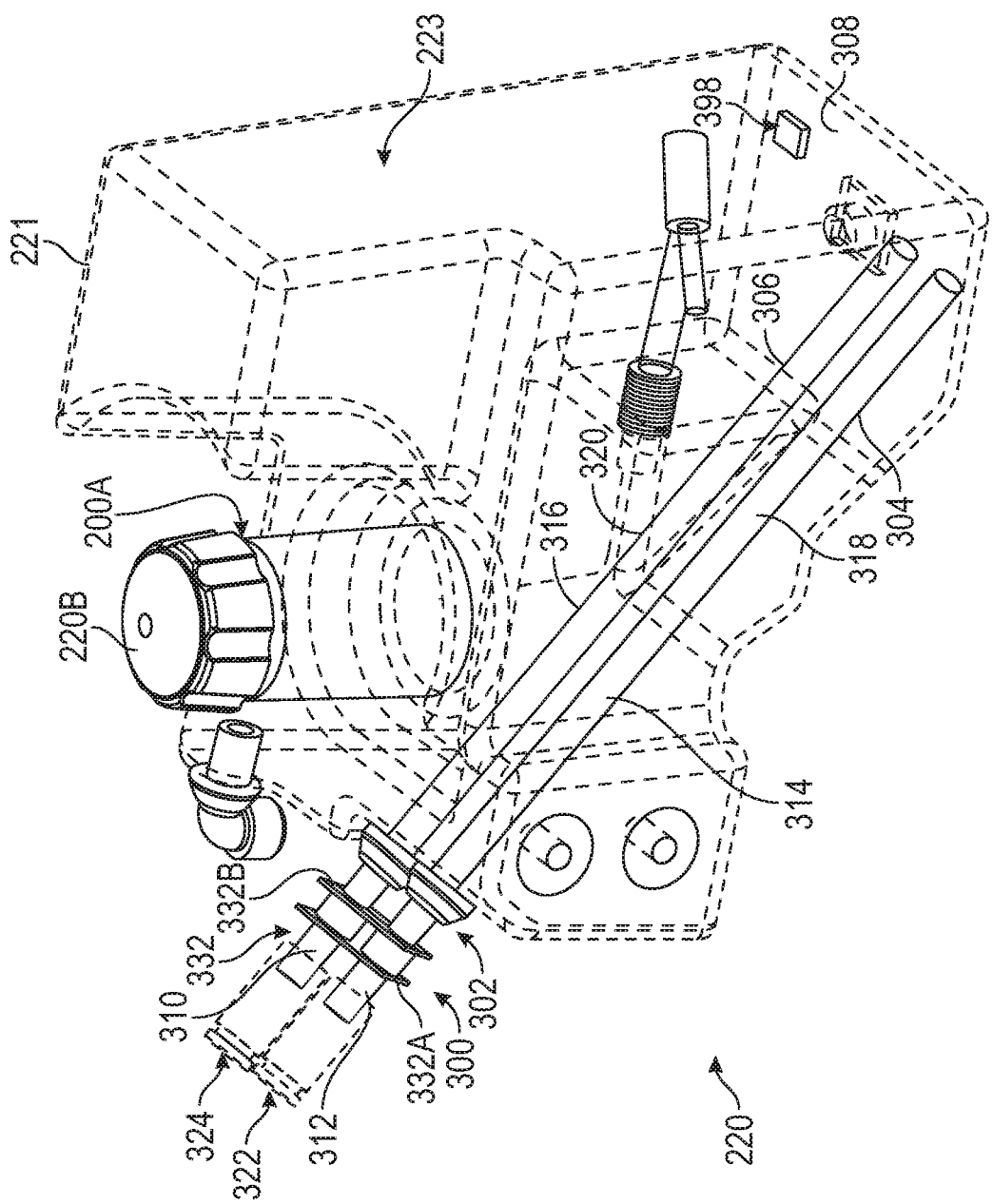

As further shown in FIGS. 9A, 9B and 9C, the conditioning fluid storage tank 220 generally will include a housing 221 that defines a chamber 223 for storage of the conditioning fluid, which typically can be an oil-based or other similar non-aqueous conditioning fluid or other suitable friction altering substances. The housing 221 is generally formed from a plastic or other polymeric material, though other materials, e.g., metals, such as aluminum, steel, etc.; composites or synthetic materials, or other materials that are suitable for holding fluids or combinations thereof, can be used without departing from the present disclosure. The chamber 223 further may include a storage capacity of two (2) or more liters of conditioning or dressing fluid for conditioning a desired or selected number of bowling lanes, though any suitable storage capacity, such as one (1), three (3), four (4), or more liters also is possible without departing from the scope of the present disclosure. The conditioning fluid tank 220 further will have one or more fill openings 220A in communication with the chamber 223 that allow an operator to fill the tank 220 with the conditioning fluid. A cap 220B or other suitable cover can at least partially engage and cover the opening(s) 220A to substantially seal the chamber 223 of the conditioning fluid storage tank 220.

The conditioning fluid tank 220 may be pressurized or non-pressurized. As discussed, the pump 226 further is in communication with the tank 220 and will be operable to draw the conditioning fluid from the conditioning fluid storage tank 220 and supply the conditioning fluid to the injector rail 230. The pump 226 may include any suitable pumping mechanism, such as a pump configured to provide, for example, up to 500 kPA of pressure for conditioning fluids having a viscosity of up to 65 centipoises or greater. The pump 226 generally will circulate the conditioning fluid through the conditioning application system 140 along the flow path 239 in a loop, while the heater is bringing the fluid up to the desired/selected temperature. The pump 226 also can be controlled so as to only be engaged and/or operate when the conditioning fluid approaches or reaches a desired temperature.

The fluid flow valve may be closed before start of a first conditioning pass, while the conditioning fluid pump 226 is engaged and fluid is built up in the fluid pressure accumulator until a desired application pressure is achieved. The fluid flow valve(s) may then allow the conditioning fluid to be supplied, under pressure, during conditioning of the particular lane. The fluid pressure sensor/regulator 228 also may contain a check/relief valve to protect the system from excess pressure. Once conditioning is completed on a lane, the fluid flow valve(s) may be opened to enable an amount of conditioning fluid to be circulated through the system before closing to again build up the desired pressure for the next lane application.

Figure 8:
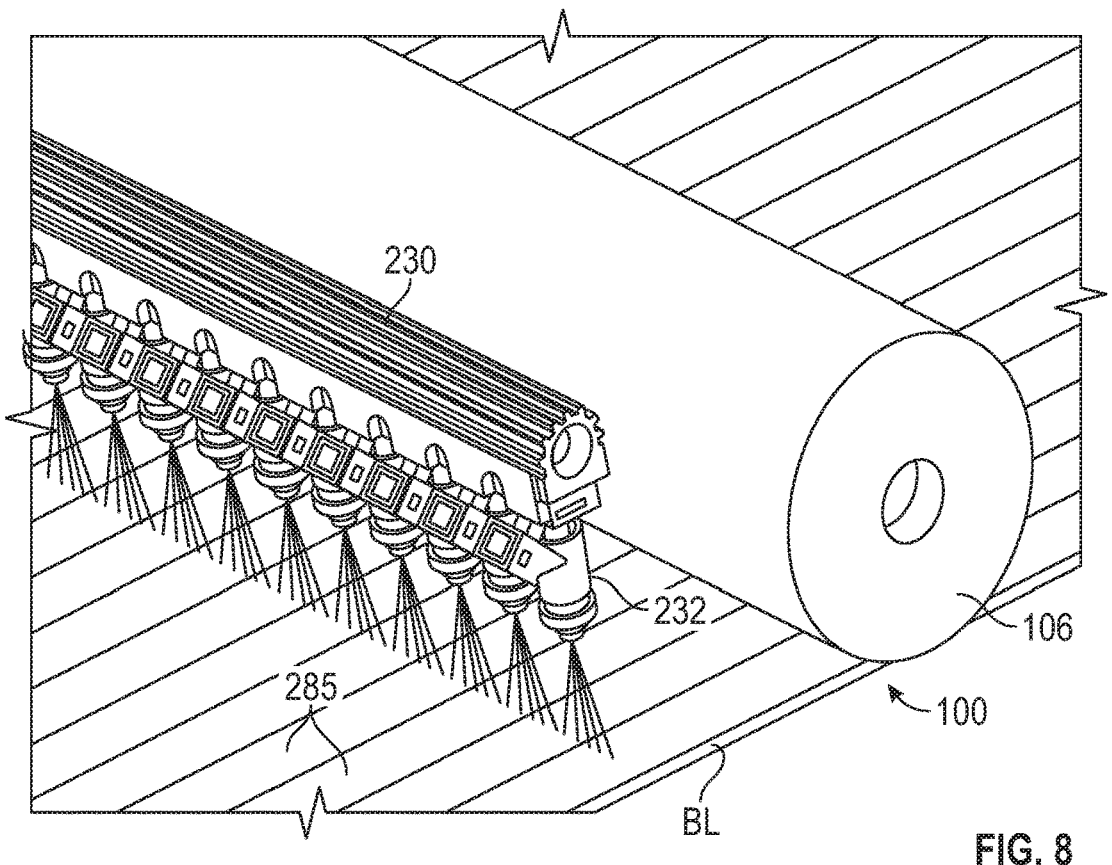
FIG. 8 is a perspective view of a plurality of delivery injectors operatively connected to an injector rail and a buffer for applying conditioning fluid onto a bowling lane.

As illustrated in FIGS. 1-3, and 7-8, a predetermined number of fluid delivery injectors 232 or other suitable dispensing mechanisms, such as nozzles, jets, etc., may be operatively connected to one or more openings or fluid passages along the injector rail 230. The injectors 232 may be equally spaced with a gap between adjacent injectors (FIGS. 7 and 8). The injectors 232 further may deliver a substantially precise volume and/or spray area of conditioning fluid based on a predetermined injector pulse duration and frequency for a selected lane conditioning pattern. The fluid pump 226 may be operatively connected to the fluid tank 220 to draw conditioning fluid from tank 220 and supply the conditioning fluid to the injectors 232, for example, at a constant pressure.

As shown in FIG. 8, conditioning fluid supplied to the injectors 232 may be directly injected onto bowling lane BL and thereafter smoothed or otherwise distributed thereabout by the buffer 106. On a return pass, the injectors 232 can be shut off and the buffer 106 may continue to operate to further smooth the conditioning fluid applied onto bowling lane BL. During the conditioning and return passes of lane conditioning system 100, buffer 106 may be operable to rotate in a direction opposite to the travel direction of lane conditioning system 100 such that buffer 106 rotates opposite to the rotation direction of drive wheels 154. It should be noted that buffer 106 may be selectively counter-rotated to operate opposite to the direction of travel of lane conditioning system 100, or instead, may be operable to rotate in the direction of travel of lane conditioning system 100.

FIGS. 9A, 9B, and 9C show a contaminant detection/sensing system 300 that is operable to detect the presence of fluid contaminants (e.g., water or another contaminating aqueous solution) in the bowling lane conditioning machine 100 according to one aspect of the present disclosure. The sensing system 300 generally will include one or more sensor assemblies or devices 302 operable to measure or detect at least one aspect of the conditioning/dressing fluid, which is indicative of the presence of one or more contaminants, such as contaminating water or other contaminating aqueous solutions, in the conditioning fluid storage tank 220. Upon detection of one or more contaminants, the sensing system 300 may cause (or signal the controller 250 to cause) a stoppage or alteration of one or more operations of the bowling lane conditioning machine 100. As a further consequence, an alarm or notification of contamination being detected also can be generated, and an error message including information related to the detection of the contaminant (e.g., time, date, etc. of the detection) can be logged or otherwise recorded in a machine log or other suitable memory.

The sensor assemblies 302 can be operable to capture or detect information related to an electrical conductivity or otherwise register a voltage across the conditioning fluid in the fluid storage tank 220. For example, detection of prescribed voltage or a change in voltage may be indicative of the presence of water or other contaminating aqueous solution in an oil-based conditioning fluid. The sensor assembly 302 can include a series of electrically conductive elements or members 304 and 306 arranged at least partially within the chamber or cavity 223 of the fluid storage tank 220 (FIG. 9C). The conductive elements 304/306 can include a first conductive element 304 and a second conductive element 306 that is spaced apart from the first conductive element 304, and each conductive member 304/306 will be at least partially submerged within the conditioning fluid contained within the fluid storage tank 220.

In one example, the conductive elements 304 and 306 can be positioned or arranged at a location that is substantially adjacent, substantially near, or otherwise along a bottom or floor 308 of the fluid storage tank 220, or at any other suitable location within or along the storage tank 220, without departing from the scope of the present disclosure. An electric current or voltage can be supplied to one of the conductive elements (i.e., 304 or 306), and if the current or voltage, or a change in voltage, is detected across or at the other conductive element, that generally will be indicative of the presence of a contaminant (e.g., contaminating water or other aqueous solution) within the conditioning fluid. For example, oil-based conditioning or dressing fluids generally are insulating and/or substantially non-conductive, and thus, conduction of voltage across/between the first 304 and second 306 conductive elements that are at least partially submerged in the conditioning fluid indicates the presence of a conducting fluid, such as contaminating water or another contaminating aqueous solution.

The conductive elements 304/306 further can be coupled to or otherwise in communication with corresponding lead portions 310/312, such as a wire or other suitable lead. In one example, one of the lead portions 310 or 312 can be connected to a power source, such as a portable power source, e.g., one or more batteries or battery packs, a power source for the bowling lane conditioning machine, or another suitable power source, and the other lead portion 310 or 312 can be connected to a grounded component or neutral source.

Furthermore, the sensing system 300 can include a controller having one or more components configured to act as voltage detecting mechanism, such as volt meter or other suitable instrument/device for measuring potential/voltage for detecting a change of voltage at or across one or more of the lead portions. Additionally, or in alternative constructions, the sensing system 300 can be in communication with the controller 250 which can include one or more components configured to measure or detect a voltage or change base or signals from the lead portions 310/312. Alternatively, the passage of current between the conducting elements can complete a circuit or otherwise activate a sensor notification mechanism. Accordingly, any suitable continuity (e.g., passage of voltage) between the lead portions 310 or 312 will indicate the presence of a conducting contaminant (e.g., water or other contaminating aqueous solution). For example, the power source may provide a voltage of up to about 5V to one of the lead portions 310 or 312 and if a reduction of voltage is read or otherwise detected at the lead portion, the sensing system 300 can determine the presence of a contaminant (e.g., water or other contaminating aqueous solution). The power source may provide a substantially constant voltage, though the voltage can be pulsed or otherwise changed, without departing from the present disclosure.

The detection of the presence of an electric current or a change in voltage at or across the lead portions 310/312 may trigger a notification or an alarm to indicate the presence of a contaminant, and further may alter or cause a stoppage of the operation of the bowling lane conditioning machine 100. For example, a detection signal can trigger a pump stop that shuts down or otherwise prevents the pump 226 from circulating fluids from the conditioning fluid storage tank 220. The notification/alarm and/or stoppage in operation of the bowling lane conditioning machine 100 further may be controlled or limited to occur if the registered change in voltage reaches a threshold value, which threshold may be selected such that substantially no water or other contaminating aqueous solution is present in the tank 220. Thus, false positives can be substantially minimized, such as when a very minimal amount of water other contaminating aqueous solution, e.g., water due to humidity, condensation, etc., present in the tank, but which will not result in damage to the components of the bowling lane conditioning machine.

Alternatively, the lead portions 310/312 can be a part of an open circuit attached to the power source, with, for example, the space between the conductive portions 304/306 attached to the lead portions 310/312 acting as a discontinuity in the open circuit, and the presence of a contaminating fluid, such as water or other contaminating aqueous solution, present will close or complete the circuit. Closure or completion of the circuit can indicate the presence of a contaminant and activate an alarm or notification, e.g., a LED, bulb, or other light source, a speaker or other sound generator, etc., and further cause alteration of one or more operations of the bowling lane conditioning machine 100, e.g., deactivation of pump 226.

FIGS. 9A, 9B, and 9C further show that the conducting elements 304 and 306 can replace and/or be part of inlet and outlet tubes 314 and 316 for the conditioning fluid storage tank 220. For example, the inlet and outlet tubes 314 and 316 each can include a generally tubular body 318 and 320 with a fluid passage 322/324 defined therethrough. Each body 318/320 further can be formed from a conductive material, such as a metallic material, e.g., aluminum, stainless steel, etc., or other suitable conductive material, and further can be in communication with the lead portions 310/312 to facilitate the detection of potential or voltage change across the conductive tubes. Alternatively, the bodies 318/320 can be formed from a non-conductive material, such as plastic, rubber, etc., and further include conductive portions connected thereto or otherwise formed or integrated therewith.

In one embodiment, the sensing system 300 can be incorporated or integrated with existing inlet and outlet tubes of the conditioning fluid storage tank 220, as a retro-fit or modification to existing bowling lane conditioning machines to enable them to be fitted with the sensing system 300. If the existing input/output tubes are not conductive, the existing tubes can be replaced with tubes constructed from or otherwise incorporating a conductive material, such as a metallic or other conductive material, or other conducting elements can be fixed to the tubes or placed along other portions of the fluid storage tank, such as along the bottom portion 308. For example, conductive leads or wires can be received within and secured along the existing tubes or can be separately mounted along the tank.

The inlet and outlet tubes 314 and 316 generally will be in communication with the pump 226 for circulation of the conditioning fluid through the conditioning fluid application system 140, i.e., to provide the conditioning fluid to the injectors 232 for application to the bowling lane BL. The inlet and outlet tubes 314/316 also can include one or more connection mechanisms 326/328, including sealing portions, fittings, etc., for coupling the tubes 314/316 to a piping, conduit, or other suitable fluid passageway that is in communication with the pump 226 (FIGS. 9A, 9B, and 9C).

As also shown in FIGS. 9A, 9B, and 9C, the sensing system 300 can include a support, mount, or grommet assembly 330 for holding/securing the conductive inlet and outlet tubes 314/316 in a spaced apart orientation or configuration. The support/grommet assembly 330 can substantially prevent, inhibit, or reduce movement or dislocation of the tubes 314/316 in one or more directions, and into contact with each other as the bowling lane machine 100 is moved, e.g., placed onto or moved about the bowling lane BL, to help prevent, reduce, or inhibit generation of false positives due to contact/engagement of the tubes 314/316 causing a voltage detection or change. The grommet assembly 330 can include one or more substantially rigid bodies 332 with a pair of openings/passages 334/336 defined therethrough for receiving the inlet and outlet tubes 314/316. The grommet assembly 330 further can be formed from a substantially non-conductive or insulating material, such as a plastic, rubber, or other synthetics or polymeric materials. In one embodiment, the grommet assembly body 332 has a plurality of connectable portions/sections 332A/332B, e.g., two symmetrical connectable portions 332A/332B received on opposing sides of the tubes 314/316 and fixed/connected together thereabout by a fastener assembly 335 (e.g., including a nut and bolt, screw, rivet, etc.).

The sensing system 300 further can include an attachment assembly 360 that couples the lead portions 310/312 to the respective inlet/outlet tubes 314/316. For example, the attachment or connection assembly 360 can include clamping portions (as shown in FIG. 9B), such as hoop clamps, pipe clamps, or other suitable clamping mechanisms engaging the tubes 314/316 and in communication with the leads 310/312. In addition, or in alternative constructions, the connection assembly can include one or more members or portions that are coupled to the grommet assembly 300 (or other portions of the tubes 314/316 or tank housing 221) and biased, e.g., by a spring or other biasing member, to engage the lead portions 310/312 against at least a portion of the inlet/outlet tubes. For example, the lead portions can be at least partially engaged and held against an exterior surface 314A/316A of the inlet/outlet tubes by the biased portions. Any attachment mechanism or connection assembly can be used, however, such as other suitable clamping assemblies or fixing means, such as adhesives, soldering, etc., without departing from the scope of the present disclosure.

Figure 10A:
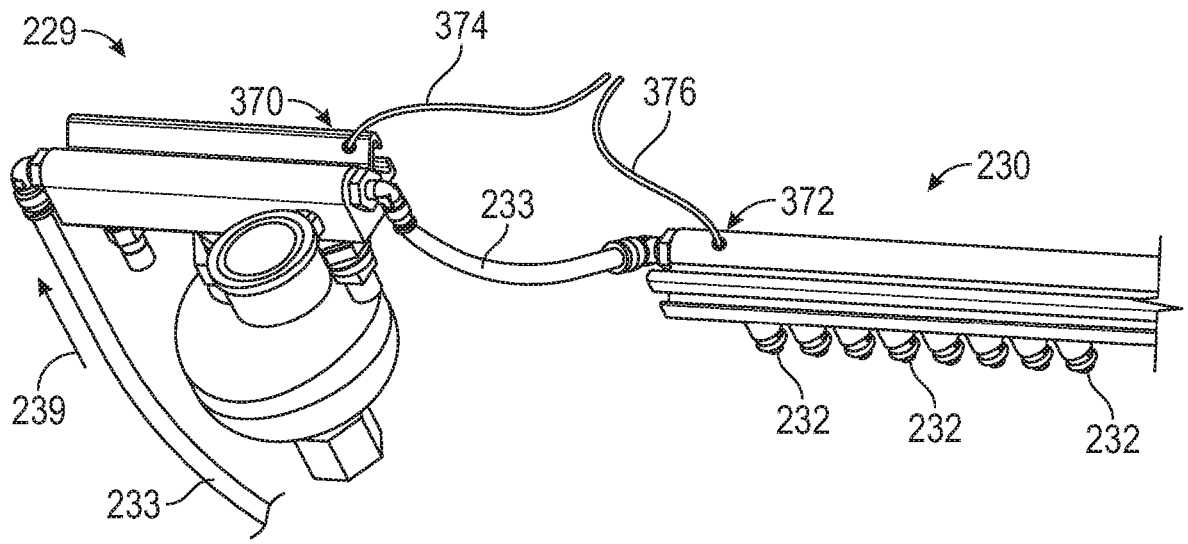
FIGS. 10A, 10B, and 10C show contaminant sensing systems according to additional variations of the present disclosure.
Figure 10B:
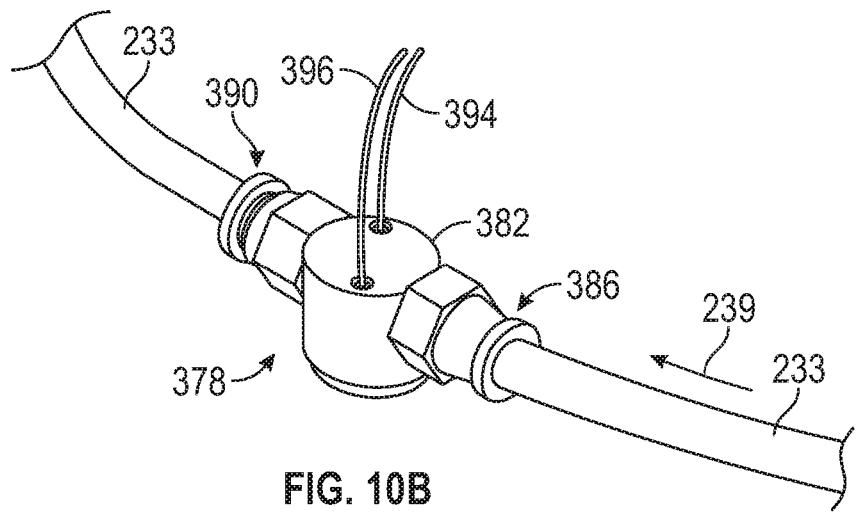
Figure 10C:
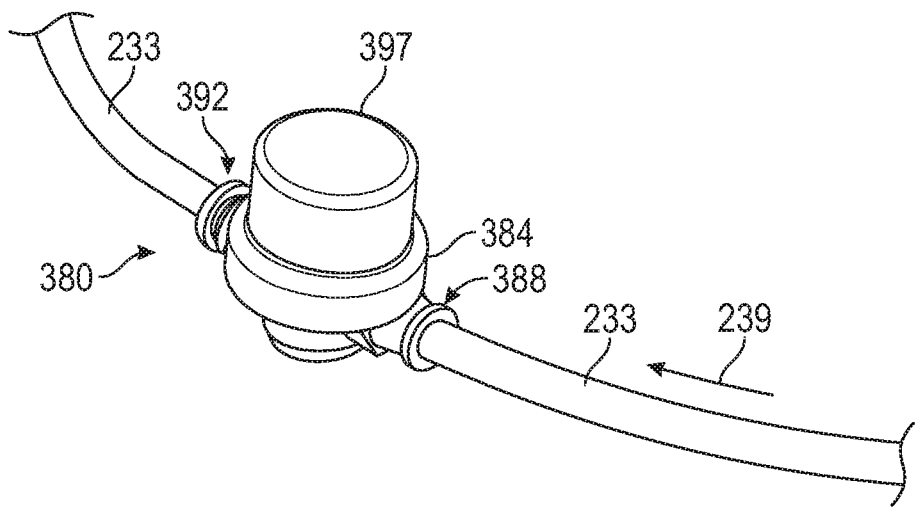

Additionally, or in alternative constructions, the sensing assembly 300 can be configured and positioned to detect/capture information related to the presence of a contaminant in the conditioning/dressing fluid at other locations along the conditioning fluid flow path 239, as generally shown in FIGS. 10A-10C. For example, FIG. 10A shows that the sensing system 300 can have conductors 370/372 and corresponding leads 374/376 that are integrated, or otherwise in communication with, one or more conditioning components (e.g., the pump 226, the pressure sensor/regulator 228, the filter 224, the accumulator 229, the injector rail 230, etc.) of the conditioning application system 140.

In the embodiment shown in FIG. 10A, one conductor 370 and a corresponding lead 374 is incorporated/connected to the accumulator 229 and another conductor 372 and corresponding lead 374 is incorporated/connected to the injector rail 230. For example, the conductors 370/372 can include conductive components of the accumulator 229 or the injector rail 230, though the conductors 370/372 can include conducting portions that are formed with or otherwise connected to or integrated with conducting or non-conducting portions of the accumulator 229 or injector rail 230. Although the accumulator 229 and injector rail 230 are shown to include conductors 370/372, any conditioning component or components, e.g., pump 226, pressure sensor/regulator 228, filter 224, etc., along the fluid flow path 239 can include one or more conducting portions/conductors integrated therewith or connected thereto, without departing from the scope of the present disclosure.

FIGS. 10B-10C show that the sensing assembly 300 further can include one or more self-contained sensing devices 378/380 connected or retrofitted to the tubing 233. For example, the sensing devices 378/380 can have a body or housing 382/384 having an inlet 386/388 and an outlet 390/392 each in fluid communication with a section or portion of the tubing 233 to allow flow of conditioning fluid through one or more passages or fluid flow paths defined through the housing/body 382/384. The housing/body 382/384 further can at least partially house/hold one or more conductors or conducting portions (not shown) positioned within the housing/body 382/384 along passages/flow paths so as to be in communication with the conditioning/dressing fluid passing through the body/housing to facilitate sensing or detection of one or more contaminants therein. FIG. 10B shows that the conductors can include leads 394/396 attached thereto or otherwise in communication therewith, which leads 394/396 further are coupled to the controller for detection of a voltage or change in voltage across the conductors, e.g., to stop the pump or trigger an alarm/notification upon a detection thereof.

In FIG. 10C, however, the conductors can be coupled to a portable power source, e.g., one or more batteries received within the housing 384, and further can be in communication with a light source 397, e.g., light bulb, LED, etc., or other notification mechanism, such as a speaker or buzzer, that will activate if a conducting contaminant, e.g., water or other contaminant, is present within the conditioning/dressing fluid, e.g., because the contaminant will complete the circuit across the conductors to illuminate/activate the light source 397 or notification mechanism Alternatively, or in addition to one or more sensor assemblies 302 for detecting change in voltage, the sensing system 300 can include a pH sensor 398, such as a pH meter or other suitable pH detector, arranged along the chamber 223 of the fluid storage tank 220, e.g., along a bottom portion 308 of the conditioning fluid storage tank 220. Generally, pH is used to refer to a solutions acidity or alkalinity, and further to the concentration of dissociated ($H^f$) ions that are free in a solution, presented on a logarithmic scale. The pH sensor 398 can measure "free" hydrogens in a solution. For oils, e.g., oil-based conditioning fluids, because the hydrogen is bound to carbon chains, no pH generally can be measured, and thus oil-based conditioning fluids typically will not yield a measurable reading on the pH sensor 398.

A reading on the pH sensor 398 thus will indicate the presence of an aqueous (water-based) solution. The pH sensor 398 may generate a binary signal to indicate the presence or detection of a pH indicating presence of a contaminating fluid, which may generate an alarm or deactivate the pump 226. Upon no reading of a pH value (i.e., only oil is present within the fluid storage tank), the pump 226 would be allowed to run normally. However, upon the accidental addition of a cleaner, water, or any other aqueous solution, a threshold pH would be detected by the pH sensor 398. Accordingly, an error message or alarm can be triggered, and the pump 226 can be stopped or blocked from running to prevent downstream contamination of components. The error further can be recorded in a machine log. Although the pH sensor 398 is shown to be in the fluid storage tank 220 in FIG. 9C, the pH sensor 398 can be positioned at any suitable position along or in communication with the flow path of the conditioning fluid, without departing from the scope of the present disclosure.

The sensing system 300 further may be in communication with a control system 250 of the bowling lane conditioning machine 100. Upon detection of a contaminant (e.g., water or a contaminating aqueous solution), the sensing system 300 can send one or more signals or information packets to the control system 250, in response to which, the control system 250 accordingly can stop or alter one or more operations of the bowling lane conditioning machine 100. The control system 250 further can be in communication with the wire leads and have one or more components configured to detect a voltage potential thereacross.

The control system 250 further can generate an alarm or otherwise notify a user if a contaminant is detected by the sensing system. For example, the controller system 250 may activate a notification mechanism upon detection of one or more contaminants, e.g., activate a illumination device, such as a light bulb or LED locating along the housing 102 of the bowling lane conditioning machine 100, or generate and/or send a message, image, or otherwise show information on a display or user interface in communication with the control system 250.

The controller 250 further may log or otherwise record information related to the detection of a contaminant, for example, the date and time when a contaminant was detected, remedial actions taken, etc., into a machine log or other suitable storage or memory, which can provide a record to a manufacturer of the incident leading to damage or failure of the lane conditioning machine due to an introduced contaminant or contaminants.

Figure 11:
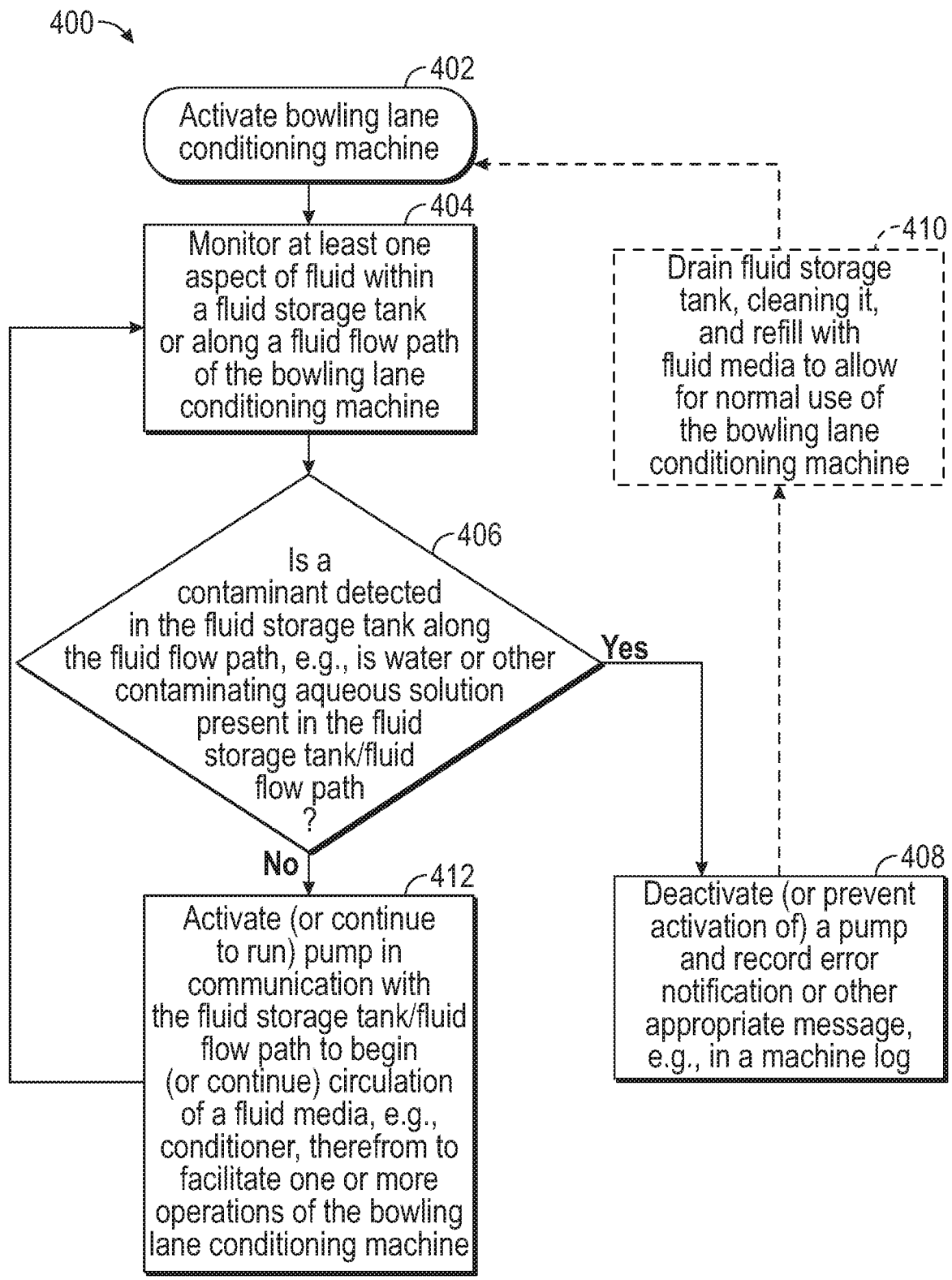
FIG. 11 shows a flowchart of the operations of the sensing system according to one aspect of the present disclosure.

FIG. 11 shows a flowchart 400 detailing the operations of the sensing system 300 according to principles of the present disclosure. As shown in FIG. 11, at Step 402, the bowling lane conditioning machine 100 is initially activated to start a cleaning and conditioning operation. After the bowling lane conditioning machine 100 is activated, the sensing system 300 will monitor at least one aspect of a conditioning fluid, e.g., electric conductivity of the fluid, a pH of the fluid, etc., within a conditioning fluid storage tank, such as the conditioner fluid storage tank 220, or otherwise along the fluid flow path of the bowling lane conditioning machine 100 (Step 404).

At Step 406, if a contaminant is detected in the fluid storage tank or along the fluid flow path, e.g., a threshold pH or voltage is detected in the fluid storage tank, the sensing system can deactivate or signal the controller 250 to deactivate or prevent activation of the one or more components, e.g., pump 226, of the bowling lane conditioning machine 100 (at Step 408). In addition, the controller 250 may log or record an error notification or other appropriate alert message, etc., for example, in a machine log or other suitable storage/memory and further may generate an alarm or otherwise trigger a notification mechanism to indicate risk of commination (e.g., display a message or other information on a display or activate an illuminating device). Accordingly, the pump 226 will not be activated or will be deactivated if a contaminant is detected in the fluid storage tank, e.g., tank 220, or otherwise along the fluid flow path to prevent the contaminant or contaminated fluid from spreading to other components of the bowling lane conditioning machine 100, for example, the injectors 232.

At step 410, as shown in FIG. 11, the fluid storage tank 220 can be drained, cleaned, and refilled with a new fluid media, for example, an oil-based conditioning fluid, to allow for normal use of the bowling lane conditioning machine 100.

If and while a contaminant, e.g., the threshold pH or voltage, is not detected in the fluid storage tank, the pump 226 will be allowed to be activated or continue to run to begin or continue circulation of the fluid media, for example, conditioning fluid, from the fluid storage tank 220 to facilitate one or more operations of the bowling lane conditioning machine 100. The sensing system 300 will continuously monitor the at least one aspect of the fluid throughout activation/operation of the bowling lane conditioning machine.

Referring again to FIGS. 1-7, the operation of lane conditioning system 100 may generally be controlled by the control system 250 operated by a user interface. For example, the control system 250 can include any suitable controller, processor, or control circuitry, such as one or more embedded PC or programmable logic controllers configured to control multiple components of lane conditioning system 100. The user interface may include one or more displays, such as monochrome or color monitor with options for selecting a cleaning and/or conditioning routine from a host of predetermined options or otherwise programming control system 250 via user interface for a custom cleaning and/or conditioning application.

The user interface further may display on-screen sensor outputs and error messages for the various sensors and up/down switches provided in lane conditioning system 100. For example, the user interface may display one or more alarms or other notifications indicating the detection of one or more contaminants by the sensing/detection system 300. User interface further may provide an operator with the ability to control the distance of the conditioning pattern and the speed of lane conditioning system 100 for applying conditioning fluid onto bowling lane BL. Control system 250 may include a connection (not shown) to a personal computer, mobile device, or the like for loading custom software and other programs, and may also include diagnostics software for determining corrective action for facilitating the precise control of precision delivery injectors 232 for custom applications and the like.

In order to clean and condition bowling lane BL, lane conditioning system 100 may first be placed on the bowling lane just beyond the foul line. The operator may then select a cleaning and/or conditioning routine from a host of predetermined options or otherwise program control system 250 via the user interface for a custom cleaning and/or conditioning application. For example, the operator may simply choose a desired conditioning pattern from viewing a two or three dimensional layout of conditioning fluid at various locations along the length of bowling lane BL, or may likewise specify a desired conditioning pattern via user interface 252. The user interface further may include popular lane conditioning patterns for recreational bowling, league bowling etc. With a cleaning and/or conditioning routine preselected from a host of predetermined options or otherwise programmed for a custom application on user interface, a start switch may be switched to an on position (i.e., pressed down) to initiate a sequence of automatic cleaning and/or conditioning operations.

A cleaning operation may be initiated by control system 250 activating vacuum pump 198 and the dryer, and by activating the squeegee up/down motor to lower squeegees 202 into contact with the bowling lane surface. Control system 250 may also activate duster cloth unwind motor 174 to rotate duster cloth supply roll 172 and produce a slack in duster cloth 184. As duster roller 176 engages the bowling lane surface under the slack of duster cloth 184, control system 250 may confirm the downward deployment of squeegees 202 and duster roller 176 by the squeegee down switch and duster down switch 188, respectively.

Thereafter, the control system 250 may activate conditioning fluid pump 226, conditioning fluid heater 222, and conditioning fluid pressure sensor/regulator 228 to begin the flow of conditioning fluid through conditioner application system 140. At the same time, the buffer up/down motor may be energized to pivot buffer 106 down into contact with bowling lane BL, the contact being confirmed by the buffer down switch.

Upon successful completion of the preliminary operations, the user interface 252 may prompt the operator to re-press start switch for performing the cleaning and conditioning operations, or may otherwise prompt the operator of any failed preliminary operations. Assuming successful completion of the aforementioned preliminary operations, the operator may then press start switch, for the second time. Control system 250 may then activate drive motor 152 at a preset speed corresponding to the preselected or otherwise customized application selected by the operator, at which time lane conditioning system 100 is propelled forward from the foul line toward the pin deck. Control system 250 may then activate buffer 106 to rotate and thereby spread the injected conditioning fluid on the bowling lane. As the lane conditioning machine 100 is being propelled forward, the cleaning fluid delivery nozzles 124 also can be adjusted or directed forward of lane conditioning system 100, as discussed above, and activate nozzles 124 to deliver cleaning fluid forward of lane conditioning system 100. The cleaning fluid on bowling lane BL may be agitated by duster cloth 184 and thereafter suctioned and dried by vacuum system 126 and the dryer, respectively, as discussed above.

Fluid delivery injectors 232 may then inject the conditioning fluid directly onto bowling lane BL by pulsing the conditioning fluid at selected intervals along the length of the bowling lane. Upon reaching the end of the preselected conditioning pattern, the buffer up/down motor may be energized to pivot buffer 106 up and out of contact from bowling lane BL, the raised position being confirmed by the buffer up switch. The rotation of buffer 106 may also be stopped at this time. In this manner, an operator may utilize the user interface 252 to visually specify a lane conditioning pattern along the length of bowling lane BL and thereafter, at the touch of a button (i.e., start switch), precisely condition the bowling lane without the guesswork associated with specifying when to begin or stop delivery of lane conditioning fluid onto a transfer roller or the bowling lane.

After completion of a forward or conditioning pass, the lane conditioning machine 100 may then execute a return pass by shutting off cleaning fluid delivery nozzles 124, vacuum system 126, the dryer, precision delivery injectors 232 and activating waste roller windup motor 182 to operate waste roller 180 to lift duster roller 176 up away from the bowling lane surface. The control system 250 also may reverse the direction of rotation of buffer 106 for rotation in the direction of travel of lane conditioning system 100, and reverse drive motor 152 to propel lane conditioning system 100 at a speed corresponding to a preselected or otherwise customized application selected by the operator.

The foregoing description generally illustrates and describes various embodiments of this disclosure. It will, however, be understood by those skilled in the art that various changes and modifications can be made to the above-discussed constructions and systems without departing from the spirit and scope of this disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A bowling lane conditioning machine for applying a conditioning or dressing fluid to a bowling lane, comprising:
 a housing;

at least one drive mechanism at least partially supported along the housing for moving the conditioning machine along the bowling lane;

at least one fluid storage tank supported within the housing for storage of the conditioning or dressing fluid;

a dispensing assembly including an injector rail in fluid communication with the at least one fluid storage tank, and having a plurality of injectors disposed therealong for dispensing the conditioning or dressing fluid to the bowling lane as the conditioning machine is moved therealong by the drive mechanism;

at least one pump for urging the conditioning or dressing fluid along a flow path extending from the at least one fluid storage tank and through the dispensing assembly; and a contaminant sensing assembly positioned along the flow path and configured for detection of one or more water-based or aqueous contaminants within the conditioning or dressing fluid, wherein upon detection of one or more contaminants within the conditioning or dressing fluid, operation of the at least one pump is stopped, prevented, inhibited, or altered.

2. The bowling lane conditioning machine of claim 1, wherein the contaminant sensing assembly comprises a plurality of conducting portions arranged at spaced locations along the flow path.

3. The bowling lane conditioning machine of claim 2, wherein the plurality of conducting portions are integrated or incorporated with input and output tubes received within the at least one fluid storage tank, and are at least partially submerged in the conditioning or dressing fluid received therein.

4. The bowling lane conditioning machine of claim 3, wherein the input and output tubes each comprise a conductive material, wherein one of the input or output tubes is connected to a power source, and another of the input or output tubes is connected to a ground, and wherein a detection of a voltage at the ground or detection of a current between the input and output tubes is indicative of at least one contaminant in the conditioning or dressing fluid.

5. The bowling lane conditioning machine of claim 2, wherein one or more of the plurality of conducting portions are integrated or incorporated with at least one of the at least one pump, the dispenser assembly, a pressure regulator or sensor, a filter, or an accumulator of the bowling lane conditioning machine.

6. The bowling lane conditioning machine of claim 1, wherein the sensing assembly includes a body that has a fluid passage defined therethrough that is in communication with one or more conduits of the bowling lane conditioning machine defining the fluid flow path, and further comprising a plurality of conduction portions positioned in or along the body for detection of a presence of at least one contaminant therein.

7. The bowling lane conditioning machine of claim 6, wherein the sensing assembly further includes one or more batteries and a notification mechanism, and wherein one conducting portion of the plurality of conducting portions is connected to the battery and one conducting portion of the plurality of conducting portions is connected to the notification mechanism, such that completion of a circuit across the conducting portions activates the notification mechanism to indicate the presence of at least one contaminant in the conditioning or dressing fluid.

8. The bowling lane conditioning machine of claim 1, wherein the sensing assembly includes one or more sensors are operable to detect a threshold pH in the conditioning or dressing fluid in the at least one storage tank.

9. A bowling lane conditioning machine, comprising:

a drive system including at least one motor coupled to a series of drive wheels for moving the conditioning machine along a bowling lane;

a cleaning fluid delivery and removal system including at least one cleaning fluid storage tank for storage of a cleaning fluid, at least one delivery nozzle coupled to the cleaning fluid storage tank for applying the cleaning fluid to the bowling lane, and a cleaner removal system and waste reservoir configured for removal and storage of cleaning fluid from the bowling lane;

a conditioning or dressing fluid delivery and application system having a conditioning or dressing fluid storage tank coupled to a dispensing assembly, the dispensing assembly including an injector rail in fluid communication with the conditioning or dressing fluid storage tank for receiving conditioning or dressing fluid from the conditioning or dressing fluid storage tank, and having a plurality of injectors disposed therealong for dispensing the conditioning or dressing fluid onto the bowling lane as the conditioning machine is moved therealong by the drive system;

at least one pump operatively connected to the conditioning or dressing fluid storage tank and configured for pumping the conditioning or dressing fluid from the conditioning or dressing fluid storage tank to the dispensing assembly; and a contaminant sensing assembly configured for detecting contaminants within the conditioning or dressing fluid;

wherein the contaminant sensing assembly comprises a series of conductive components adapted to detect a change in voltage in the conditioning or dressing fluid, a pH sensor adapted to detect a solution acidity or alkalinity of the conditioning or dressing fluid, or a combination thereof indicative of a presence of a contaminant within the conditioning or dressing fluid; and wherein upon detection of one or more contaminants within the conditioning or dressing fluid, operation of the at least one pump is stopped or substantially blocked from pumping the conditioning or dressing fluid from the conditioning or dressing fluid storage tank.

10. The bowling lane conditioning machine of claim 9, wherein the contaminant sensing assembly further comprises a body positioned along a fluid flow path for the conditioning or dressing fluid and in communication with one or more conduits extending between the conditioning or dressing fluid storage tank and the injectors of the dispensing assembly, the body having a fluid passage defined therethrough; and wherein conductive components of the contaminant sensing assembly are positioned in or along the body for detection of the presence a contaminant within the conditioning or dressing fluid flowing therethough.

\* \* \* \* \*